May 18, 1926. 1,585,489
H. V. HAILMAN
MULTIFOCAL GLASSES
Filed Jan. 16, 1925
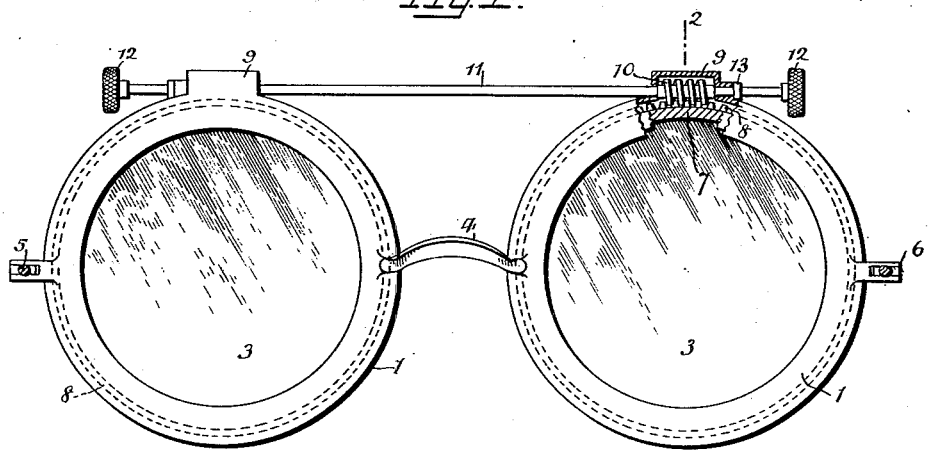
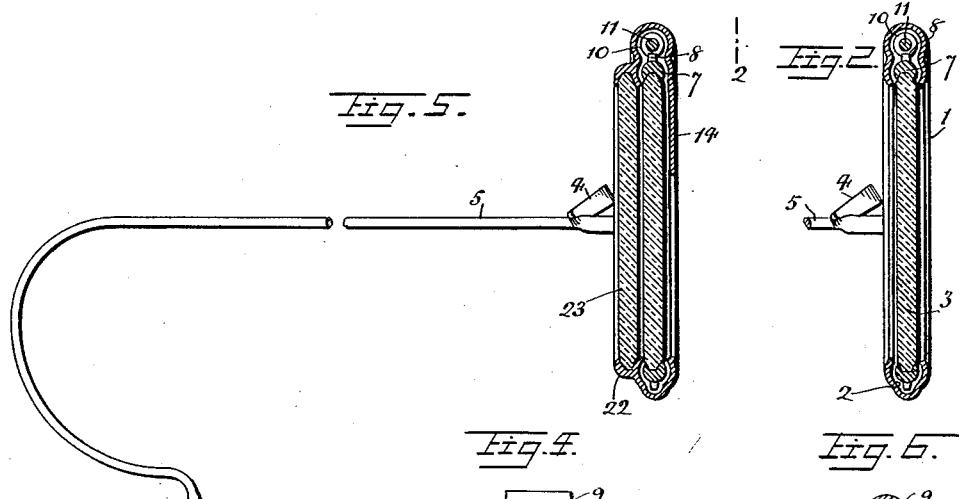
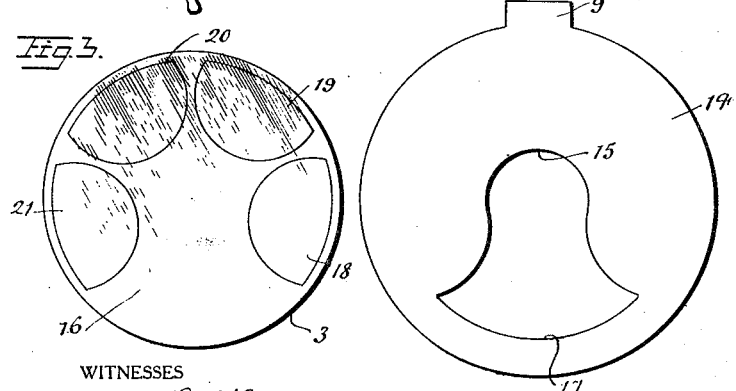
WITNESSES
H. T. Walker
Harry E. Seidel.
INVENTOR
H. V. Hailman
BY Munn & Co
ATTORNEYS Patented May 18, 1926.

1,585,489

UNITED STATES PATENT OFFICE.

HUBERT VICTOR HAILMAN, OF FORT WASHAKIE, WYOMING.

MULTIFOCAL GLASSES.

Application filed January 16, 1925. Serial No. 2,906.

This invention relates to multifocal glasses and has for its object the provision of a device for furnishing any number of focal points having visional acuity at any predetermined distance from the user's eye whereby a person may see clearly and distinctly any object without the removal of his glasses or without being required to turn his head at various angles as is necessary with the usual bifocal lens in order to bring an object into view.

Another object of the invention is the provision of a pair of glasses so constructed that by the manipulation of a single element, any one of a plurality of lenses may be brought into position within the line of vision.

A further object of the invention is the provision of a device having a plurality of lenses adapted to be selectively positioned before the eye, the number of lenses being controlled by the focal deficiencies of the wearer.

This invention will be best understood from a consideration of the following detailed description, in view of the accompanying drawings forming part of the specification; nevertheless it is to be understood that the invention is not confined to the disclosure, being susceptible of such changes and modifications which shall define no material departure from the salient features of the invention as expressed in the appended claims.

In the accompanying drawings:

Figure 1 is a rear elevation partly in section of a pair of glasses constructed according to the principles of my invention.

Figure 2 is a vertical section taken along the line 2—2 of Figure 1, showing a lens rotatably mounted in a rim.

Figure 3 is a plan view of a multifocal lens.

Figure 4 is a plan view of a shield for each multifocal lens.

Figure 5 is a transverse vertical section of a modified form of eye glasses.

Figure 6 shows a modified form of rim having a light guard.

Referring more particularly to the drawings, 1 designates an annular rim of channel shape in formation and providing a chamber 2 in which is adapted to be rotatably mounted a multifocal lens 3. A pair of these rims are connected together by a bridge 4 and ear guards 5 are pivotally connected upon lugs 6 projecting laterally from the outer peripheral edges of the rims 1. The lens 3 is mounted within an annular ring 7 which is provided with worm gears 8 at its outer periphery. When desired the ear guards or bows may be omitted and the frame supported on the nose by the usual spring and clamp construction.

A casing 9 is mounted at the top of each rim 1 and forms a housing for a worm 10 which meshes with the worm gear 8 on the lens 3. Each of the worms mounted for rotation at the top of the rims 1 are connected with a shaft 11 which has operating knobs 12 at its opposite ends which are adapted to be grasped by the thumb and forefinger for rotating the same and likewise rotating the worm 10. A nut or flange 13 on the shaft 11 at points on the shaft adjacent the outer end of the housing 9 and abutting the same, maintain the shaft in a predetermined position.

A front portion of the rim 1 is extended inwardly forming a partial closure 14 to restrict a quantity of light rays passing through the lens 3 and has an opening, the upper portion 15 of which is enlarged about the center of the lens 3 for viewing objects at a distance through the distance portion 16 of the lens 3, while the lower portion 17 of said opening permits vision through any one of the segmental lenses 18, 19, 20 and 21. The member 14 forms a shield for the eyes and is employed only when required or is desirable.

In the modified form shown in Figure 5, the rim at the rear is provided with an extenled flange 22 in which is adapted to be mounted a stationary lens 23 to be employed only when compound lenses are required.

A light guard 24, shown more particularly in Figure 6, may be connected to the rim 1ᵃ just below the worm housing 9. The particular light guard having a concave reflecting surface 25 and an opening 26 to permit vision, will focus the rays of light upon a given point when the user faces the light and is especially useful when the work which is being viewed is close to the eye.

An opaque or a semi-transparent light guard without a reflecting surface which is capable of diminishing the quantity of light or the quality of the light entering the eyes of the wearer may be employed. Furthermore the light guard need not be formed integrally with the frame but may be formed as a separate unit and attached to the frame in any approved manner.

The opening in the light guard may be utilized to support the distance lens so that there may be if necessary two stationary lenses and one revolving lens or vice versa.

In the operation of the device, a portion 16 of the lens 3 will give distant vision while the segmental portion 21 may be placed adjacent the lower curved portion 17 of the opening in the guard 14 for relatively near vision by rotating the shaft 11. A continued rotation of said shaft will bring into the line of vision a segmental lens 20 which may be employed for nearer vision. Lenses 19 and 18 are graded for closer work than lenses 20 and 21.

It must be borne in mind that any combination of stationary lens 23 or the lens 3 may be employed to give the best results for a patient and therefore I do not intend to limit myself to the particular form of lens employed.

It will be particularly noted that the rotation of the shaft 11 causes a simultaneous rotation of both the lenses in the rims so that the lenses are accurately and properly adjusted for both eyes to give the proper vision and limit any strain upon the eyes of the wearer.

What I claim is:

1. A pair of glasses comprising a frame having a pair of rims, each rim being provided with an annular track a multifocal lens mounted for rotation in the track, cooperating means on the rim and lens for causing simultaneous rotation of each of the lenses in the rims and a stationary lens mounted at the rear of each revolving lens.

2. A pair of glasses comprising a frame having a pair of rims each rim being provided with an annular track, a multifocal lens mounted for rotation in the track, cooperating means on the rim and lens for causing simultaneous rotation of each of the lenses in a rim, and a semi-transparent guard mounted on the front portion of each rim, said semi-transparent guard being provided with a central opening, said opening extending downwardly toward the lower edge of the rim.

3. A pair of glasses comprising a frame having a pair of rims, each rim being provided with an annular track, a multifocal lens mounted for rotation in the track cooperating means on the rim and lens for causing simultaneous rotation of each of the lenses in a rim and an opaque light guard mounted on the front portion of each rim, said opaque light guard being provided with a central opening, said opening extending downwardly toward the lower edge of the rim.

4. A pair of glasses comprising a frame having a pair of rims, each rim being provided with an annular track, a multifocal lens mounted for rotation in the track, cooperating means on the rim and lens for causing simultaneous rotation of each of the lenses in the rims, and a stationary lens mounted at the rear of each revolving lens and a semitransparent guard having a central opening and carried by the front portion of each frame, said opening extending downwardly toward the edge of the rim.

5. A pair of glasses comprising a frame having a pair of rims, each rim being provided with an annular track, a lens rotatably mounted in each rim, teeth mounted on the periphery of each lens, each rim at the upper end thereof being provided with an extension forming a housing, a shaft mounted for rotation in the housings, spaced worms on the shaft a worm being located in each housing and meshing with the teeth on a lens the ends of the shaft projecting from the housing and provided with manipulating means, and means on the shaft and in engagement with an end of each housing to prevent longitudinal movement of the shaft.

6. A pair of glasses comprising a frame having a pair of rims, each rim being provided with an annular track, a multifocal lens mounted for rotation on the track, cooperating means on the rim and lens for causing simultaneous rotation of each of the lenses and the rim.

7. A pair of glasses comprising a frame having a pair of rims, each rim being provided with an annular track, a multifocal lens mounted for rotation in the track, cooperating means on the rim and lens for causing simultaneous rotation of each of the lenses in the rim, and a stationary lens mounted at the rear of each revolving lens.

HUBERT VICTOR HAILMAN